No. 639,396. Patented Dec. 19, 1899.
W. G. JIBBEN.
UNLOADER.
(Application filed Sept. 13, 1899.)

(No Model.) 2 Sheets—Sheet 1.

Witnesses: Inventor:
William G. Jibben,
by Collamer & Co., Attorneys.

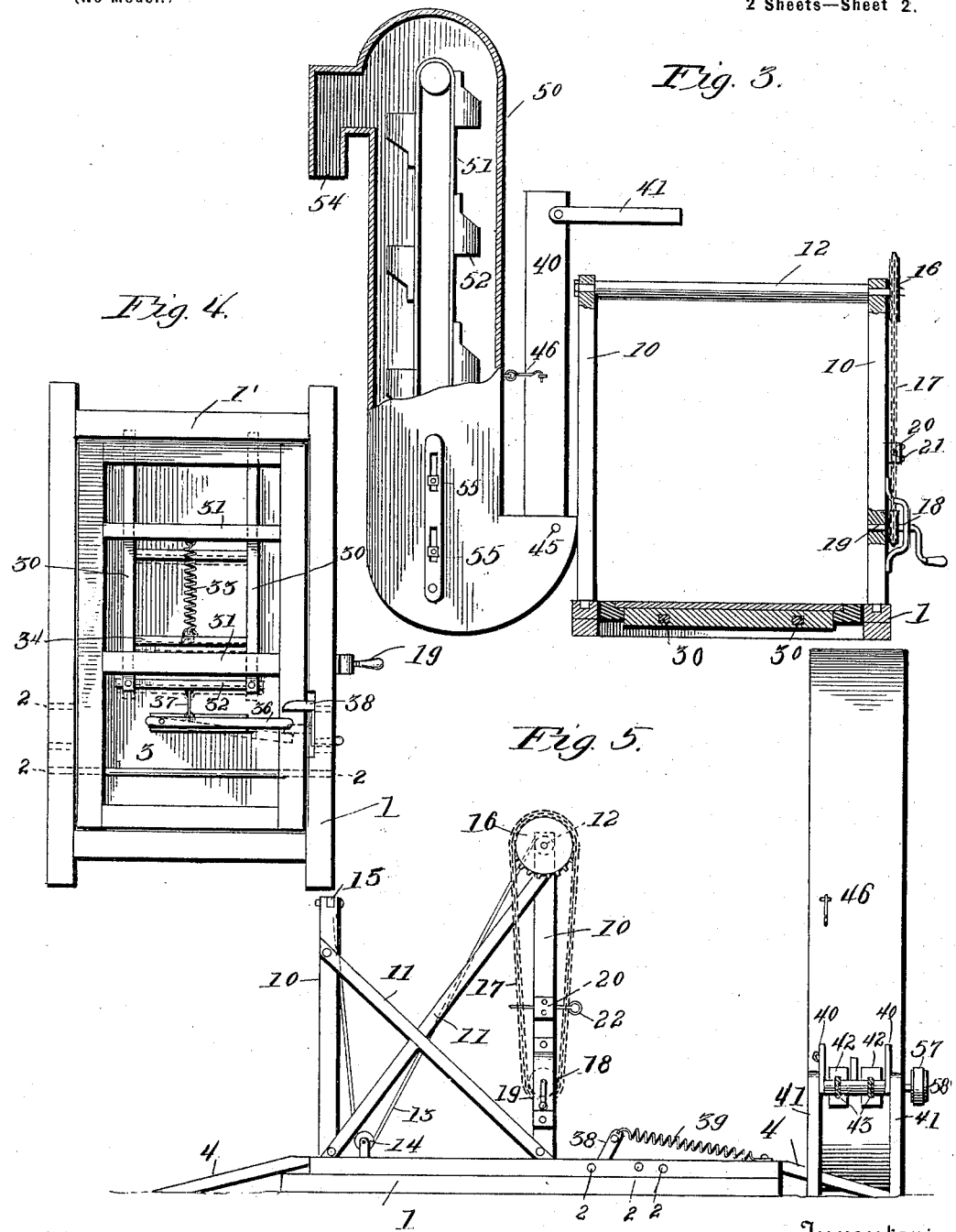

UNITED STATES PATENT OFFICE.

WILLIAM G. JIBBEN, OF WESTBOROUGH, MISSOURI.

UNLOADER.

SPECIFICATION forming part of Letters Patent No. 639,396, dated December 19, 1899.

Application filed September 13, 1899. Serial No. 730,376. (No model.)

*To all whom it may concern:*

Be it known that I, WILLIAM G. JIBBEN, a citizen of the United States, and a resident of Westborough, Atchison county, State of Missouri, have invented certain new and useful Improvements in Unloaders; and my preferred manner of carrying out the invention is set forth in the following full, clear, and exact description, terminating with claims particularly specifying the novelty.

This invention relates to loading and unloading, and more particularly to that class of machines which employ a tilting platform; and the object of the same is to produce a device whereby a wagon loaded with corn or the like may be driven onto a dump, tilted so as to deliver the corn into a carrier, whence it is conveyed to an elevator, and by the latter it is delivered into a bin or other receptacle.

To this end the invention consists in the specific construction of all of the parts embracing this device, as hereinafter more fully described and claimed, and as illustrated in the accompanying drawings, wherein—

Figure 1:
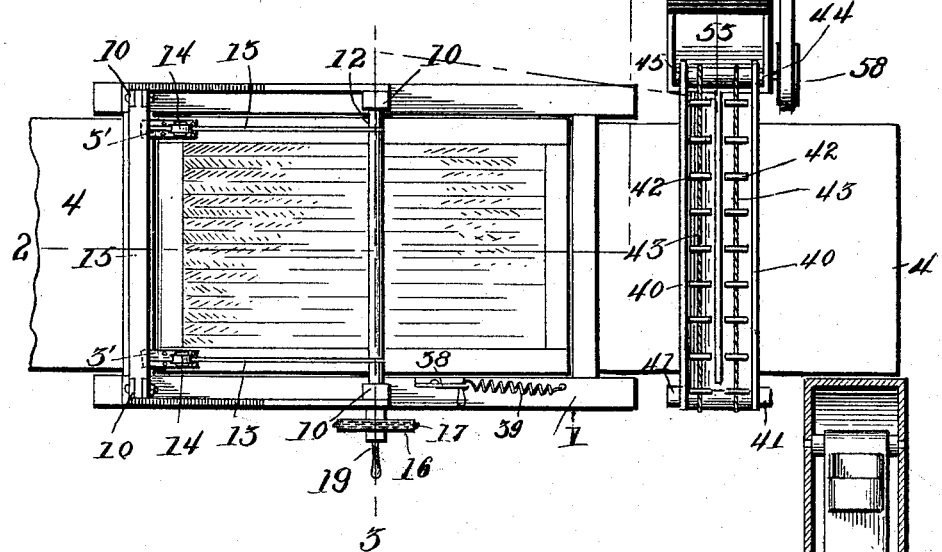
Figure 2:
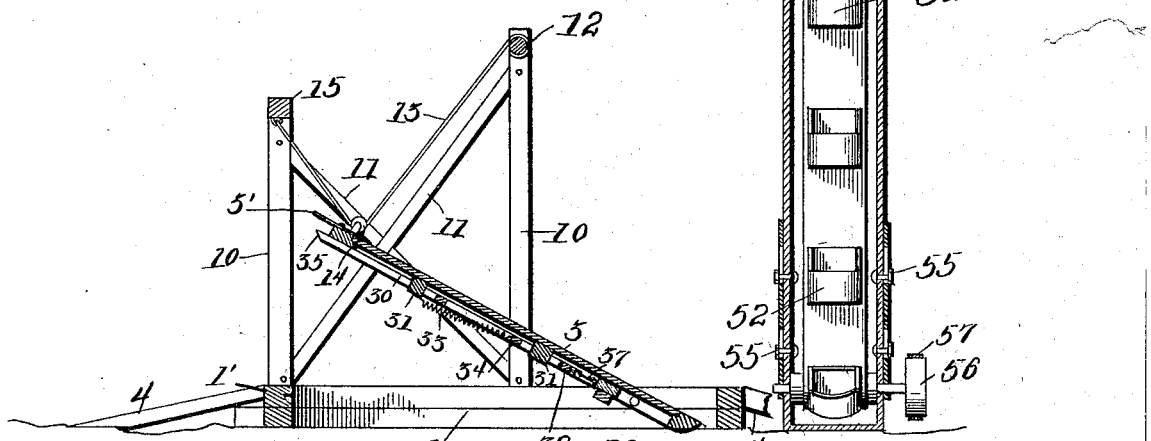

Figure 1 is a plan view of the unloader complete. Fig. 2 is a section on the line 2 2 of Fig. 1 with the dump raised. Fig. 3 is a section on the line 3 3 of Fig. 1, taken through the center of the elevator, the dump being lowered and the carrier raised. Fig. 4 is a bottom plan view of the dump and its frame, with the catch shown in dotted lines as withdrawn. Fig. 5 is an elevation of the right side of the dump and the end of the carrier, showing the specific construction of windlass-lock which I employ.

This machine comprises a dump, with its windlass and lock, a catch for holding the dump in horizontal position, a carrier to which the dumped wagon delivers, and an elevator to which the carrier delivers and by which the grain is raised so as to be dropped into a bin, a railway-car, a boat, or any suitable receptacle. While these parts are necessarily of independent construction, they all combine in producing an unloading device by means of which a wagon loaded with grain or with corn on the ear can be quickly unloaded in such manner that the grain can be delivered into some other receptacle than the wagon. The specific construction of parts will now be described.

*The dump.*—The numeral 1 designates a framework suitably staked to the ground and through whose side bars is formed a series of holes 2. Through one of said series is passed a rod on which is journaled a platform 3, which fits within the frame. 4 4 are inclined boards leading, respectively, to the entrance and exit ends of said frame, so that a team can be driven onto the same and the wagon will rest on the platform, while the horses pass beyond the same. The pivot-rod may obviously be passed through any of the series of holes 2, which are considerably to the rear of the longitudinal center of the platform, and this adjustment is regulated according to the weight of the load.

*The windlass.*—Rising from said platform are uprights 10, suitably braced, as at 11, and in one pair of uprights is journaled a shaft 12, around which passes a rope 13, leading under pulleys 14 at the free end of the platform 3 and extending up to a cross-bar 15, connecting the other pair of uprights. On one end of the shaft 12 is a sprocket-wheel 16, connected by belt 17 with another sprocket-wheel 18, mounted on a crank-shaft 19, which is journaled in suitable bearings in one upright 10 in such manner that when the crank is turned the shaft 12 is rotated to raise the free end of the platform 3.

*The lock.*—20 is a block, on opposite sides of which the sprocket chain or belt 17 runs, and this block has a transverse hole 21, through which may be passed a pin 22, which is adapted also to pass through links in the chain or belt 17, so that when this pin is in place the movement of the belt is prevented. Thus it will be seen that after the crank has been operated to raise the free end of the platform the pin can be inserted through the block and chain to prevent said platform from reassuming a horizontal position, and this I consider one of the features of my invention.

*The catch.*—Referring now more especially to Fig. 4, 30 30 are two bolts sliding in guides 31 beneath the platform 3 and connected at their inner ends by a cross-bar 32, and 33 is a spring connecting the guides 31 with a connecting-bar 34 between said bolts in such manner as to throw the latter normally forward. Their outer ends are beveled, as at 35, so as to automatically engage with the front bar 1' of the frame when the platform is lowered into alinement therewith, and at this time stops 3' on said platform rest upon this front cross-bar 1', so as to prevent the platform from descending too low. 36 is a pivoted lever beneath the platform, connected by a link 37 with the cross-bar 32 of the bolts 30, and 38 is a foot-piece pivoted within the frame 1, with its lower end in position to engage the free end of the lever 36 and its upper end drawn normally in the opposite direction by a spring 39. It follows from this construction that when said upper end is moved in a direction to expand this spring the lower end of the foot-piece bears the free end of the lever 36 in a direction to move the cross-piece and both bolts 30 so as to disengage the free ends 35 of the latter from the front cross-bar 1' of the frame. Especial attention is called to the fact that this foot-piece is located in the frame rather than in the platform, the advantage being that it is out of the way of the wagon, which is driven onto the platform, and can be moved by the foot of an operator standing beside the same, so as to release the platform and allow it to dump at the proper moment. On the return of the platform to its horizontal position the beveled ends 35 of the bolts 30 reëngage the frame 1, as will be clear.

*The carrier.*—40 is a trough supported at one end by legs 41 and at the other end by the elevator, hereinafter described, and the body of this trough stands substantially horizontal and across and above the rear end of the dump. Within this trough moves a carrier composed of slats 42, mounted on endless belts 43, the arrangement and location of parts being such that the slats will carry to the left the grain delivered from the body of the wagon on the dump. The belts are driven from a shaft 44, which is connected by belting or otherwise with the main shaft of the elevator, hereinafter described, although the specific means for driving this carrier are not essential to the present invention. The trough 40 is mounted on a pivot 45 through the body of the elevator, described hereinafter, and hooks and eyes 46 are provided on the carrier and elevator for the purpose of holding the latter in elevated position when desired. In order to drive a team upon the dump, it is necessary first to raise the trough or carrier and hook it in elevated position, after which the team can be driven up the inclined board 4 onto the dump. Then the trough is lowered, the windlass is operated to incline the platform 3 and with it the wagon, and the machinery is set in motion to cause the carrier to deliver into the elevator.

*The elevator.*—50 is an upright casing within which is mounted an endless belt 51, carrying buckets 52, which latter descend into and take the grain from a receptacle 53, wherein said grain is delivered by the carrier, and deliver the same out of a spout 54 at the upper end of the casing. 55 designates adjustable bearings for one of the axles of the elevator, whereby the same may be adjusted to take up the looseness in the belt. 56 is a wheel on one shaft of the elevator, connected by belt 57 with a wheel 58 on one shaft of the carrier, whereby the latter is driven from the former, and both these devices are operated by and from any suitable source of power. (Not herein illustrated or described.)

With the above construction of parts it follows that when the carrier is raised and hooked to the elevator and a wagon is driven onto the dump the latch of the latter is tripped and the windlass is operated to raise the same, so as to incline the body of the wagon to the rear. This causes the grain, corn, or the like to flow out of the rear end of the wagon when its tail-board is raised, and it passes into the carrier. From the carrier it is conveyed into the elevator, which latter raises it and delivers it into whatever receptacle may be provided under its delivery-spout. Especial attention is called to the fact that as the horses are passing over the dump the platform is locked against movement in either direction; but when they have been driven beyond the same a movement of the lock trips the platform, so that it can be raised by means of the windlass and can be held in elevated and inclined position by means of the pin passing through the windlass-chain. The grain flowing then from the wagon passes into the carrier, whence it is delivered into the elevator, and by the latter it is raised and delivered into the corn-crib, car, boat, or whatever other receptacle is provided. Especial attention is also called to the fact that the lock for the platform is of such construction that it will not permit the descent or ascent of the same as the team passes over it; but when tripped by the foot-piece it will readily move to an inclined position, as is necessary for the successful operation of the entire machine.

I do not limit myself to the precise details of construction nor to the materials, proportions, or sizes of parts except as hereinbefore more particularly set forth, and such changes in the mechanism may be made as do not cause the entire machine to differ from the construction hereinafter claimed. I am aware that it is old in devices of this character to dump a wagon and to convey the grain or other material dumped thereby to an elevator which raises and delivers it at any desired point, and on this feature I lay no claim; but What I do claim, and desire to secure by Letters Patent, is—

1. In a wagon-dump, the combination with a frame having a series of holes through its side bars, a rod through one of said series, and a platform journaled on said rod; of a catch for holding said platform in horizontal position, uprights rising from the frame, a windlass journaled in one pair of said uprights, ropes leading from the windlass under pulleys connected to the platform to a cross-bar connecting the other pair of uprights, and means for checking the movement of said windlass, as and for the purpose set forth.

2. In a wagon-dump, the combination with a frame, a platform pivoted therein, a catch for removably holding it in horizontal position, and a superstructure consisting of uprights mounted on the frame; of a windlass journaled in one pair of said uprights, connections between said windlass and the outer end of the platform, a block on one of said uprights provided with a transverse hole, a crank-shaft connected with said windlass by a sprocket-chain which runs on opposite sides of said block, and a pin removably inserted through said chain and the hole in the block, as and for the purpose set forth.

3. In a wagon-dump, the combination with the frame, the platform pivoted therein, and means for raising its free end; of bolts sliding in guides beneath the platform and connected by a cross-bar, the forward ends of said bolts being beveled so as to engage the front bar of the frame, stops on the platform for resting on said bar when the platform is lowered, a connecting-bar between said bolts, a contractile spring between this connecting-bar and the guides, a lever connected with the cross-bar, and means for retracting the lever when the platform is lowered, as and for the purpose set forth.

4. In a wagon-dump, the combination with the frame, the platform pivoted therein, and means for raising its free end; of bolts sliding beneath the platform with their free ends engaging the front bar thereof, a cross-bar connecting their rear ends, a lever pivoted at one end beneath the platform and connected by a link with the cross-bar, and a spring-operated foot-piece pivoted within the frame and having its lower end engaging said lever when the platform is lowered, as and for the purpose set forth.

5. In a wagon-dump, the combination with a frame, a platform pivoted therein, spring-actuated bolts for holding the platform in horizontal position, and a lever pivoted to the platform and connected with said bolts; of a foot-piece pivoted through one side of the frame with its lower end in position to engage said lever when the platform is lowered, and a spring bearing the upper end of said foot-piece in a direction to throw its lower end normally out of said engagement, as and for the purpose set forth.

6. In an unloader, the combination with a wagon-dump comprising a frame, a platform pivoted therein, means for tilting the same, and inclined inlet and outlet boards; of an elevator, a horizontal carrier pivoted to and delivering into said elevator and standing normally above and across the inlet-board of said platform, and mechanism for driving the elevator and carrier, all as and for the purpose set forth.

7. In an unloader, the combination with a wagon-dumping device located upon the ground; of an elevator at one corner of said device, a horizontally-disposed carrier pivoted to said elevator and normally extending across the inlet end of the dump, and means for holding the carrier temporarily elevated when it is desired to drive onto the dump, all as and for the purpose set forth.

In testimony whereof I have hereunto subscribed my signature this the 18th day of August, A. D. 1899.

WILLIAM G. JIBBEN.

Witnesses:
 HENRY BULLERDIEK,
 WILLIAM KEMPER.